(12) United States Patent
Gotanda et al.

(10) Patent No.: US 12,488,349 B2
(45) Date of Patent: Dec. 2, 2025

(54) MONITORING APPARATUS, SETTLEMENT APPARATUS, AND PROGRAMS

(71) Applicant: TOSHIBA TEC KABUSHIKI KAISHA, Tokyo (JP)

(72) Inventors: Tsuyoshi Gotanda, Tokyo (JP); Yusuke Mimura, Tokyo (JP); Daisuke Takeuchi, Izunokuni Shizuoka (JP); Yoshio Tanaka, Tokyo (JP); Anna Tsuboi, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 309 days.

(21) Appl. No.: 18/085,423

(22) Filed: Dec. 20, 2022

(65) Prior Publication Data
US 2023/0259944 A1   Aug. 17, 2023

(30) Foreign Application Priority Data
Feb. 14, 2022   (JP) .................... 2022-020710

(51) Int. Cl.
G06Q 20/00   (2012.01)
G06Q 20/20   (2012.01)
G06Q 20/40   (2012.01)

(52) U.S. Cl.
CPC ....... *G06Q 20/4016* (2013.01); *G06Q 20/208* (2013.01)

(58) Field of Classification Search
CPC ........... G06Q 20/4016; G06Q 20/208; G06Q 20/204; G06Q 20/209; G07G 1/0009; G07G 1/0018
See application file for complete search history.

(56) References Cited

U.S. PATENT DOCUMENTS

2010/0166324 A1*  7/2010  Kundu .............. G07F 19/207
                                            382/218
2018/0276456 A1   9/2018  Miyagi
2019/0327451 A1  10/2019  Takeno

FOREIGN PATENT DOCUMENTS

| JP | 2011054038 A | 3/2011 |
| JP | 2018160140 A | 10/2018 |
| JP | 2019193089 A | 10/2019 |
| JP | 2021157420 A | 10/2021 |

OTHER PUBLICATIONS

Japanese Office Action dated May 27, 2025, mailed in counterpart Japanese Application No. 2022-020710, 6 pages.

* cited by examiner

*Primary Examiner* — Rokib Masud
(74) *Attorney, Agent, or Firm* — Kim & Stewart LLP

(57) ABSTRACT

A monitoring apparatus includes a camera interface, a terminal interface, a communication interface, and a processor. The processor is configured to recognize actions of a settler at a point-of-sale terminal based on images from a camera, recognize input operations performed at the point-of-sale terminal by the settler based on information from the point-of-sale terminal and detect fraudulent acts based on a recognized action and a recognized input operation at the point-of-sale terminal. The processor outputs a fraud detection image corresponding to a detected fraudulent act to at least one of the point-of-sale terminal and an attendant terminal.

20 Claims, 13 Drawing Sheets

FIG. 4

| 521 | IMAGING TIME | FRAME IMAGE |
|---|---|---|
| | | |
| | | |
| | | |
| | | |
| | ⋮ | ⋮ |

FIG. 5

| 522 | TRANSITION TIME | STATUS |
|---|---|---|
| | | |
| | | |
| | | |
| | | |
| | ⋮ | ⋮ |

FIG. 6

| 523 | REGISTRATION TIME | COMMODITY NAME | COMMODITY IMAGE |
|---|---|---|---|
| | | | |
| | | | |
| | | | |
| | | | |
| | ⋮ | ⋮ | ⋮ |

FIG. 7

| 524 | RECOGNITION TIME | FRAUD DIVISION | NUMBER OF TIMES | FRAUD RECOGNITION IMAGE |
|---|---|---|---|---|
| | | | | |
| | | | | |
| | | | | |
| | | | | |
| | ⋮ | ⋮ | ⋮ | ⋮ |

MONITORING APPARATUS, SETTLEMENT APPARATUS, AND PROGRAMS

CROSS-REFERENCE TO RELATED APPLICATION

This application is based upon and claims the benefit of priority from Japanese Patent Application No. 2022-020710, filed Feb. 14, 2022, the entire contents of which are incorporated herein by reference.

FIELD

Embodiments described herein relate generally to a monitoring apparatus and a settlement apparatus for retail stores and the like.

BACKGROUND

In recent years, in retail stores such as a supermarket, a self-service POS (Point Of Sales) terminal has been attracting attention from the viewpoint of personnel expenses, improved infection control, and the like. The self-service POS terminal is a settlement apparatus at which a customer performs operations from item registration to settlement (payment) by himself or herself. However, full self-service systems may be subject to increased concerns of fraudulent behavior. Therefore, development of techniques and equipment that can prevent fraudulent acts of customers has been demanded.

BRIEF DESCRIPTION OF THE DRAWINGS

FIG. 4 is a schematic diagram illustrating a data structure of an image memory.
FIG. 5 is a schematic diagram illustrating a data structure of a state memory.
FIG. 6 is a schematic diagram illustrating a data structure of a list memory.
FIG. 7 is a schematic diagram illustrating a data structure of a fraud memory.

DETAILED DESCRIPTION

An object of embodiments is to provide techniques and devices for preventing fraudulent acts of customers at a settlement apparatus adapted to a full self-service mode.

According to one embodiment, a monitoring apparatus includes a camera interface for connecting to a camera, a terminal interface for connecting to a point-of-sale terminal, and a communication interface for connecting to an attendant terminal. A processor is configured to recognize actions of a settler at the point-of-sale terminal based on images from the camera and recognize input operations performed at the point-of-sale terminal by the settler based on information from the point-of-sale terminal. The processor is configured to detect fraudulent acts of the settler based on a recognized action of the settler at the point-of-sale terminal and a recognized input operation of the settler at the point-of-sale terminal. The processor may then output a fraud detection image corresponding to a detected fraudulent act to at least one of the point-of-sale terminal and the attendant terminal.

An example embodiment is explained below with reference to the drawings.

[Explanation of a Checkout System]

Figure 1:
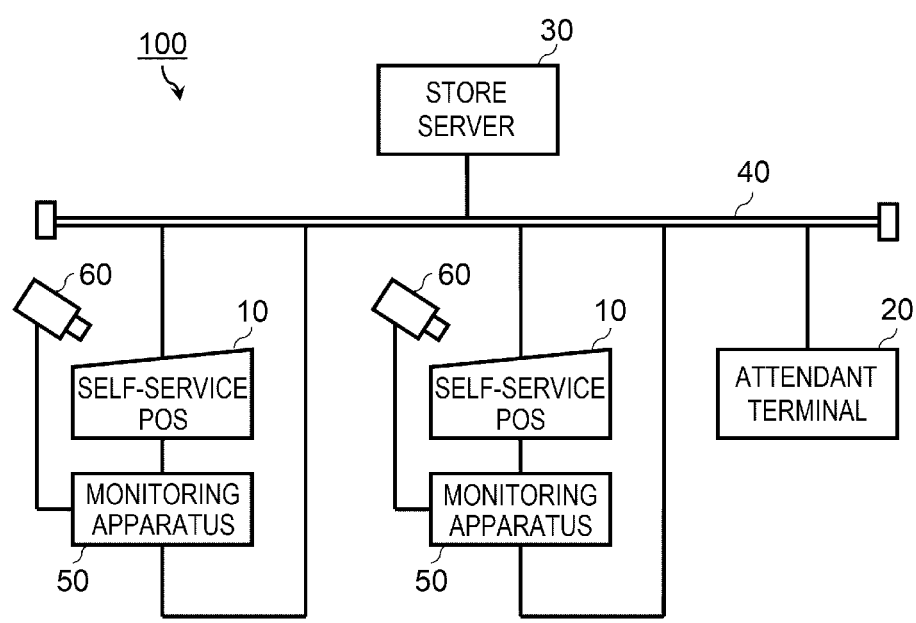
FIG. 1 depicts a checkout system of a full self-service type.

FIG. 1 is a schematic configuration diagram illustrating a checkout system 100 of a full self-service type. The checkout system 100 includes a plurality of self-service POS terminals 10, an attendant terminal 20, and a store server 30. In the checkout system 100, the self-service POS terminals 10, the attendant terminal 20, and the store server 30 are connected by a communication network 40 such as a LAN (Local Area Network). The store server 30 provides various services relating to the checkout system 100 to the self-service POS terminals 10 and the attendant terminal 20.

A plurality of self-service POS terminals 10 are set in a checkout place of a store. A customer finishing shopping goes to one of the self-service POS terminals 10 for checkout. The customer places items for purchase in a shopping basket or the like while on a store selling floor where commodities are displayed and then moves to the checkout place to operate one of the self-service POS terminal 10 to perform registration of items and settlement of the sales transaction by himself or herself. The self-service POS terminal 10 is an example of a settlement apparatus. A settlement apparatus can be referred to as a settlement terminal, a checkout apparatus, a checkout terminal, a commodity registration apparatus, a commodity registration terminal, or the like.

The attendant terminal 20 is set in a monitoring place provided near an exit of the checkout place. The attendant terminal 20 can display, on a display device, a list of commodities registered at each of the self-service POS terminals 10. If an error occurs at the self-service POS terminal 10, the attendant terminal 20 outputs information concerning the error. A store clerk (also referred to as an "attendant" in this context) is present in the monitoring place and monitors the checkout place based on the information displayed on the attendant terminal 20. Note that, in FIG. 1, one attendant terminal 20 is set. However, a plurality of attendant terminals 20 may be connected to the communication network 40.

The self-service POS terminals 10 respectively include monitoring apparatuses 50. Each of the monitoring apparatuses 50 may be on the outside of the self-service POS terminal 10 or on the inside of the self-service POS terminal 10. The monitoring apparatus 50 is an apparatus for monitoring a customer (also referred to in this context as a "settler") who operates the self-service POS terminal 10. Specifically, the monitoring apparatus 50 monitors a settler based on information such as an image captured by a camera 60 provided near the self-service POS terminal 10 and, if the settler takes a fraudulent action, issues an alert. A fraudulent action is, for example, an action of bagging an item without registering the item at the self-service POS terminal 10. A fraudulent action is, for example, exiting the checkout place with an item without paying for the item. A notification destination of the issued alert can be both or just one of the associated self-service POS terminal 10 and the attendant terminal 20. The monitoring apparatuses 50 are connected to the attendant terminal 20 via the communication network 40 and are capable of outputting alert signals to the attendant terminal 20. The monitoring apparatuses 50 may be connected to the attendant terminal 20 via a means other than the communication network 40.

[Explanation of the Self-Service POS Terminal]

Figure 2:
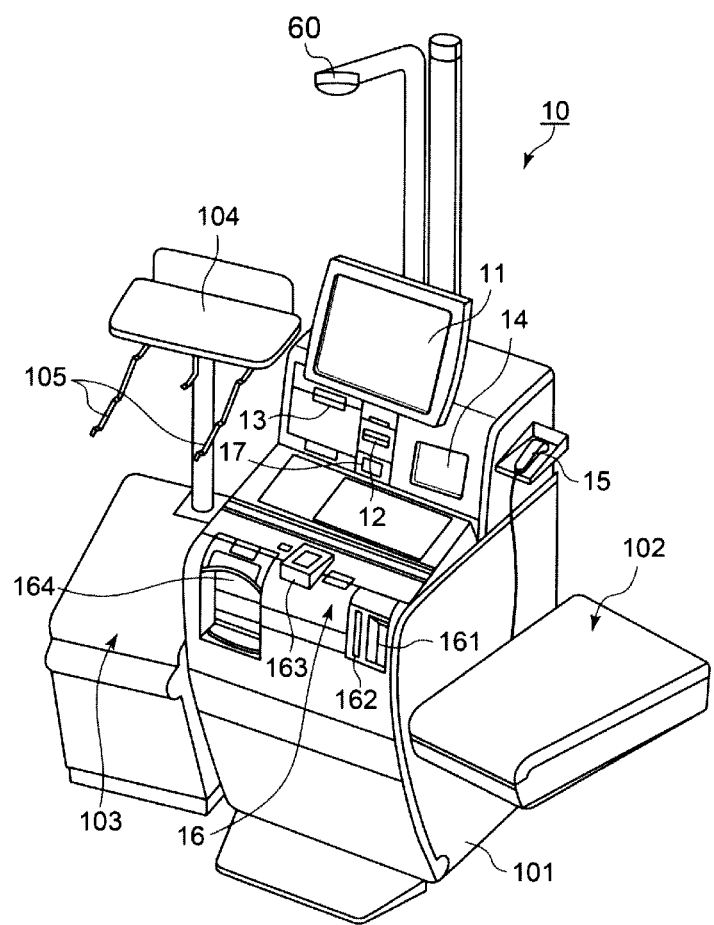
FIG. 2 is a perspective view illustrating an exterior configuration of a self-service POS terminal.

FIG. 2 is a perspective view illustrating an exterior configuration of the self-service POS terminal 10. The self-service POS terminal 10 includes a main body 101, a first commodity placing table 102 and a second commodity placing table 103 disposed on either side of the main body 10. The first commodity placing table 102 (disposed on the right side of the main body 101 in FIG. 2) is a place for a customer to place items before registration. The items before registration are usually in a shopping basket which may also be placed on the first commodity placing table 102. The items may also be placed directly on the first commodity placing table 102 before registration when, for example, a customer uses a shopping cart during shopping.

The second commodity placing table 103 (disposed on the left side of the main body 101 in FIG. 2) is a place for the customer to place items after registration. The items after registration may be put in a storage body such as a shopping basket, a store-provided bag (also referred to as a register bag or a store bag), or a reusable shopping bag placed on the second commodity placing table 103. The items after registration may also be directly placed on the second commodity placing table 103 in some instances. In FIG. 2, a temporary placing table 104 is depicted above the second commodity placing table 103 on a column. The temporary placing table 104 is for temporarily placing an item before putting the item into a register bag or the like. Two holding arms 105 are provided attached to the temporary placing table 104. The settler can place a register bag, a reusable shopping bag, or the like on the second commodity placing table 103 in an opened state using the holding arms 105.

The main body 101 includes a touch panel 11, a card reader 12, a printer 13, a scanner 14, a hand scanner 15, a cash processing machine 16, and a speaker 17 as input and output devices.

The touch panel 11 includes a display functioning as a display device and a touch sensor functioning as an input device. The display displays various screens such as a settlement start screen, a commodity registration screen, a payment method selection screen, and a checkout screen. The settlement start screen is a screen for receiving a transaction settlement start. A start key for instructing the transaction settlement start is disposed on the settlement start screen. The settler who wants to start registering items touches the start key. When the touch sensor detects that the start key is touched, a controller of the self-service POS terminal 10 switches a screen of the display from the settlement start screen to the commodity registration screen.

The commodity registration screen is a screen for displaying detail information such as a commodity name, a price, and a total amount of registered items. A checkout key for instructing to proceed to price payment for the registered item(s) is disposed on the commodity registration screen. The settler who finishes registering items next touches the checkout key. When the touch sensor detects that the checkout key is touched, the controller of the self-service POS terminal 10 switches the screen of the display from the commodity registration screen to the payment method selection screen.

The payment method selection screen is a screen for receiving a selection of a payment method such as cash payment, credit card payment, or electronic money payment. A cash key for requesting a cash payment, a credit key for requesting a credit card payment, an electronic money key for requesting an electronic money payment, and the like are disposed on the payment method selection screen. For example, a settler desiring cash payment touches the cash key. If the touch sensor detects that the cash key is touched, the controller of the self-service POS terminal 10 switches the screen of the display from the payment method selection screen to the checkout screen. The checkout screen is a screen for displaying a total amount of a transaction, a deposit amount of cash, a change amount (a change due amount), and the like.

The card reader 12 is a device that reads data recorded in a card medium such as a credit card, an electronic money card, or a point card. If the card medium is a magnetic card, the card reader 12 is a magnetic card reader. If the card medium is an IC card (an integrated circuit chip based card), the card reader 12 is an IC card reader. The self-service POS terminal 10 may include just one of the magnetic card reader or the IC card reader or may include both of the magnetic card reader and the IC card reader. The card reader 12 may be a card reader-writer having a function of writing data to a card.

The printer 13 prints data relating to a purchase receipt, a credit card slip, or the like on receipt paper. The receipt paper printed by the printer 13 is cut by a cutter and dispensed from a receipt dispensing port. The printer 13 is realized by, for example, a thermal printer or a dot impact printer.

The scanner 14 and the hand scanner 15 acquire information for identifying a commodity (item) being registered in the transaction. In this embodiment, the scanner 14 and the hand scanner 15 read a barcode attached to the item as the information for identifying the item. The scanner 14 optically reads the barcode attached to the item held over a reading window (a glass window) such that the barcode attached to the item faces the reading window. The hand scanner 15 is hand-held and operated by a settler. The hand scanner 15 is brought close to the barcode attached to the item to optically read the barcode. The scanner 14 and the hand scanner 15 only have to read information for recognizing the item and may read information of a code such as a two dimensional code other than the barcode.

The cash processing machine 16 processes cash. The cash processing machine 16 includes a bill depositing port 161, a bill discharging port 162, a coin depositing port 163, and a coin discharging port 164. The cash processing machine 16 processes bills deposited to the bill depositing port 161. The cash processing machine 16 discharges bills serving as change from the bill discharging port 162. The cash processing machine 16 receives and processes coins deposited to the coin depositing port 163. The cash processing machine 16 discharges coins serving as change from the coin discharging port 164.

The speaker 17 outputs sound such as warning sound serving as an alert or voice serving as a message.

The camera 60 functioning as an imaging apparatus is attached above the main body 101. The camera 60 images a settler who operates the self-service POS terminal 10. As illustrated in FIG. 2, the display of the touch panel 11, a card insertion port of the card reader 12, the receipt dispensing port of the printer 13, the reading window of the scanner 14, and the bill depositing port 161, the bill discharging port 162, the coin depositing port 163, and the coin discharging port 164 of the cash processing machine 16 are disposed on one surface (hereinafter referred to as front surface) of the main body 101. Therefore, the settler stands to face the front surface of the main body 101 and operates the self-service POS terminal 10. The camera 60 images substantially the entire body of the settler from above. Therefore, the head, the face, both the shoulders, both the arms, the chest, the abdomen, and the like of the settler are imaged by the camera 60.

[Explanation of the Configuration of the Monitoring Apparatus]

Figure 3:
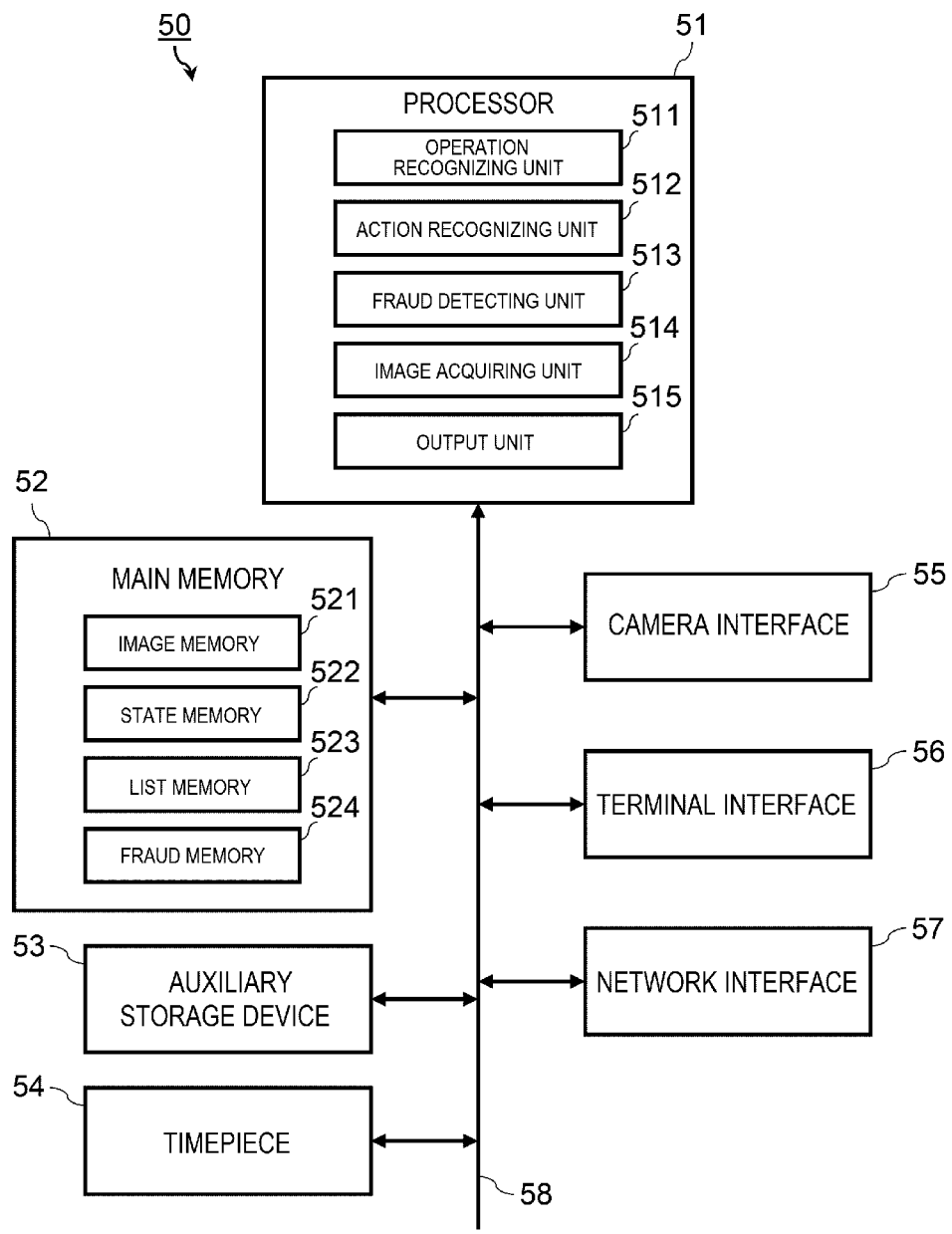
FIG. 3 is a block diagram of a monitoring apparatus.

FIG. 3 is a block diagram illustrating a main part circuit configuration of the monitoring apparatus 50. The monitoring apparatus 50 includes a processor 51, a main memory 52, an auxiliary storage device 53, a timepiece 54, a camera interface 55, a terminal interface 56, a network interface 57, and a system transmission line 58. The system transmission line 58 includes an address bus, a data bus, and a control signal line. The system transmission line 58 connects the processor 51 and the other units and transmits data signals exchanged between the processor 51 and the other units.

In the monitoring apparatus 50, a computer is configured by connecting, with the system transmission line 58, the processor 51, the main memory 52, the auxiliary storage device 53, the timepiece 54, the camera interface 55, the terminal interface 56, and the network interface 57.

The processor 51 is equivalent to a central part of the computer. The processor 51 controls the units according to an operating system or application programs to realize various functions of the monitoring apparatus 50. The processor 51 is, for example, a CPU (Central Processing Unit).

The main memory 52 is equivalent to a main storage part of the computer. The main memory 52 includes a nonvolatile memory region and a volatile memory region. The main memory 52 stores the operating system and the application programs in the nonvolatile memory region. The main memory 52 sometimes stores, in the nonvolatile or volatile memory region, data necessary for the processor 51 in executing processing for controlling the units. The main memory 52 uses the volatile memory region as a work area where data is rewritten as appropriate by the processor 51. The nonvolatile memory region is, for example, a ROM (Read Only Memory). The volatile memory region is, for example, a RAM (Random Access Memory).

The auxiliary storage device 53 is equivalent to an auxiliary storage part of the computer. For example, an EEPROM (Electric Erasable Programmable Read-Only Memory), a HDD (Hard Disk Drive), or an SSD (Solid State Drive) can be the auxiliary storage device 53. The auxiliary storage device 53 stores data used by the processor 51 in performing various kinds of processing, data created by the processing in the processor 51, and the like. The auxiliary storage device 53 sometimes stores the application programs described above.

The camera 60 is connected to the camera interface 55. The camera interface 55 outputs a control signal for controlling the camera 60. The camera 60 performs an imaging operation according to the control signal. The camera interface 55 takes in the image data captured by the camera 60.

The self-service POS terminal 10 is connected to the terminal interface 56. The terminal interface 56 performs data communication with the attendant terminal 20.

The attendant terminal 20 is connected to the network interface 57 via the communication network 40. The network interface 57 performs data communication with the attendant terminal 20.

The monitoring apparatus 50 having such a configuration uses a part of the volatile memory region in the main memory 52 as regions of an image memory 521, a state memory 522, a list memory 523, and a fraud memory 524.

FIG. 4 is a schematic diagram illustrating a data structure of the image memory 521. The image memory 521 is a region for storing, in correlation with imaging time, a plurality of frame images captured by the camera 60 at the time.

FIG. 5 is a schematic diagram illustrating a data structure of the state memory 522. The state memory 522 is a region for storing a plurality of status data in correlation with transition time. The status data is data indicating various possible states concerning the actions of a settler who operates the self-service POS terminal 10 and the operations performed at the self-service POS terminal 10 by the settler. Details of these states are explained below. The transition time is the time when a change to a state as indicated by the status data occurs.

FIG. 6 is a schematic diagram illustrating a data structure of the list memory 523. The list memory 523 is a region for storing a plurality of registered commodity data in correlation with registration time. The registered commodity data is data relating to an item registered by the self-service POS terminal 10 and includes a commodity name (item name) and a commodity image (item image). The registered commodity data may further include data such as a price and the number of purchased articles. The commodity image may be omitted for some examples.

FIG. 7 is a schematic diagram illustrating a data structure of the fraud memory 524. The fraud memory 524 is a region for storing a plurality of fraud data in correlation with recognition time. The fraud data includes a fraud division, the number of times fraud has been detected in the transaction, and a fraud recognition image. The fraud division is information for identifying a fraud type. The number of times value reflects the number of detected fraud occurrences. The fraud recognition image is an image in which a fraud type can be recognized.

Referring back to FIG. 3, the processor 51 provides functions of an operation recognizing unit 511, an action recognizing unit 512, a fraud detecting unit 513, an image acquiring unit 514, and an output unit 515. The operation recognizing unit 511 recognizes an operation input to the self-service POS terminal 10 by a settler. The operation recognizing unit 511 is an example of operation recognizing means. The action recognizing unit 512 recognizes an action of the settler to the self-service POS terminal 10. The action recognizing unit 512 is an example of action recognizing means. The fraud detecting unit 513 is detects a fraudulent act of the settler based on recognition results of the action recognizing unit 512 and the operation recognizing unit 511. The fraud detecting unit 513 is an example of fraud detecting means. The image acquiring unit 514 acquires an image for corresponding to the fraudulent act detected by the fraud detecting unit 513 from the camera 60. The image acquiring unit 514 is an example of image acquiring means. The output unit 515 outputs the image corresponding to the fraudulent act to either one or both of the self-service POS terminal 10 or the attendant terminal 20. The output unit 515 is an example of output means.

The functions of the operation recognizing unit 511, the action recognizing unit 512, the fraud detecting unit 513, the image acquiring unit 514, and the output unit 515 are realized by information processing instructions executed by the processor 51 according to a settler monitoring program.

The settler monitoring program can be a type of an application program stored in the main memory 52 or the auxiliary storage device 53. A method of installing the settler monitoring program in the main memory 52 or the auxiliary storage device 53 is not particularly limited. The settler monitoring program can be installed in the main memory 52 or the auxiliary storage device 53 by being recorded in a removable recording medium or being distributed via a network. A format of the recording medium does not matter so long as the recording medium can store a program. For example, the recording medium can be a CD-ROM, a memory card, or the like.

[Explanation of the Functions of the Monitoring Apparatus]

The functions of the operation recognizing unit 511, the action recognizing unit 512, the fraud detecting unit 513, the image acquiring unit 514, and the output unit 515 as implemented by the processor 51 of the monitoring apparatus 50 are explained with reference to flowcharts of FIGS. 8 to 14 and the screen examples illustrated in FIGS. 15 and 16. Procedures of the flowcharts and specific content of the procedures explained below are only examples. The procedures and the content can be changed as appropriate so long as the same effects can be achieved. The depicted screen examples are also only examples. Layouts, display items, and the like of the screen examples can be varied as appropriate.

Figure 8:
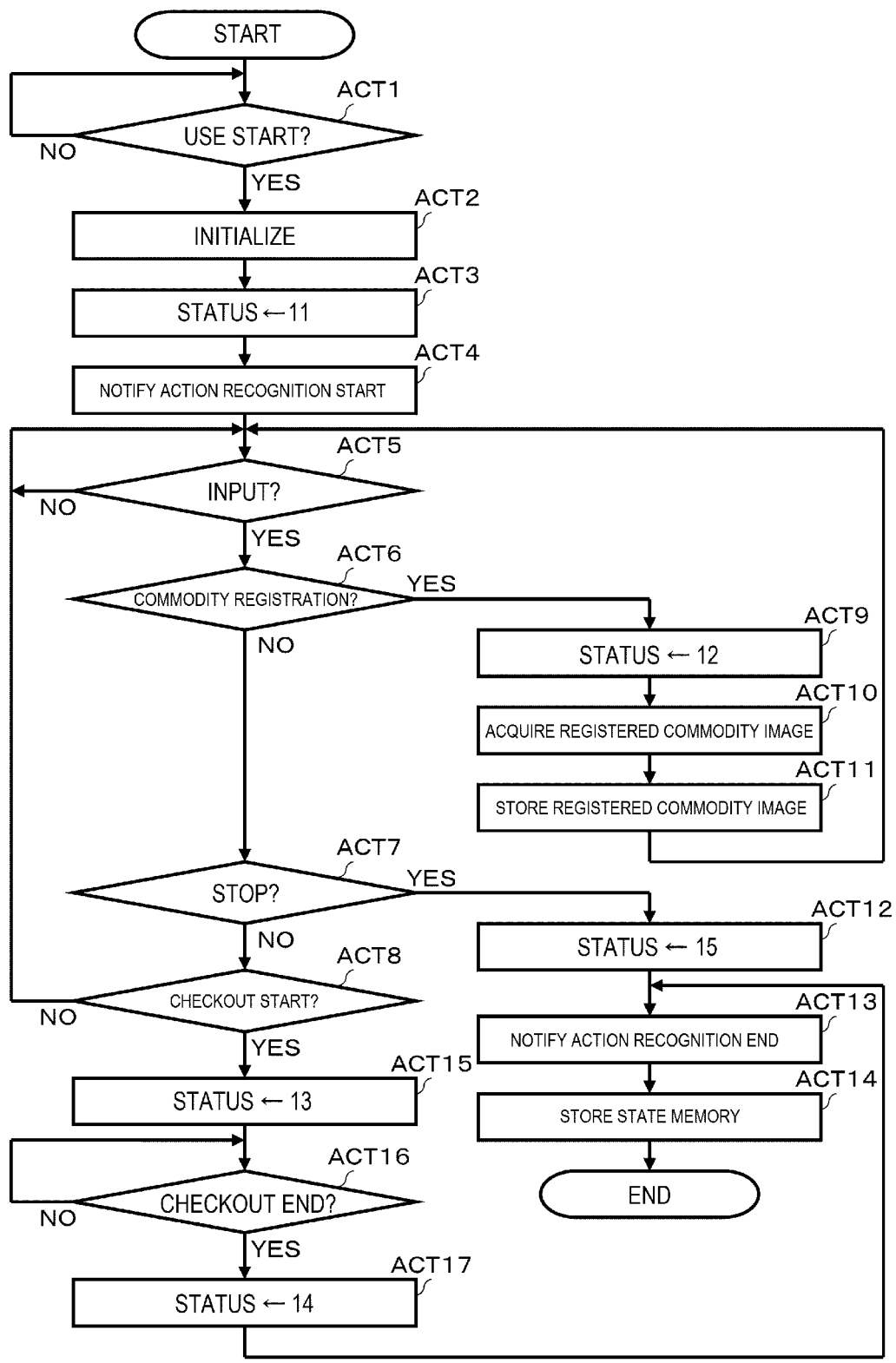
FIG. 8 is a flowchart for explaining a function of an operation recognizing unit.

FIG. 8 is a flowchart for explaining the function of the operation recognizing unit 511. A settler finishing shopping and entering the checkout place stands in front of a self-service POS terminal 10 not in use. The settler places a shopping basket storing items to be purchased on the first commodity placing table 102 and places an empty storage body such as a shopping basket, a register bag, or a reusable shopping bag on the second commodity placing table 103. A settlement start screen is displayed on the touch panel 11 of the self-service POS terminal 10. The settler touches a start key disposed on the settlement start screen.

In ACT 1 in FIG. 8, the processor 51 of the monitoring apparatus 50 waits for a use start. The information indicating a use start is output from the self-service POS terminal 10 to the monitoring apparatus 50 in response to the start key of the settlement start screen being touched or the like. If the information indicating the use start is received, the processor 51 proceeds to ACT 2. In ACT 2, the processor 51 initializes the image memory 521, the state memory 522, the list memory 523, and the fraud memory 524. In ACT 3, the processor 51 acquires, as a transition time, the present time clocked by the timepiece 54 and stores a status "11" in the state memory 522 in correlation with the transition time. The status "11" indicates the use start of the self-service POS terminal 10 by the settler has been recognized.

In ACT 4, the processor 51 notifies an action recognition start and begins performance of the functions of the action recognizing unit 512 in parallel to the functions of the operation recognizing unit 511. For convenience of explanation, the function of the action recognizing unit 512 is explained first.

Figure 9:
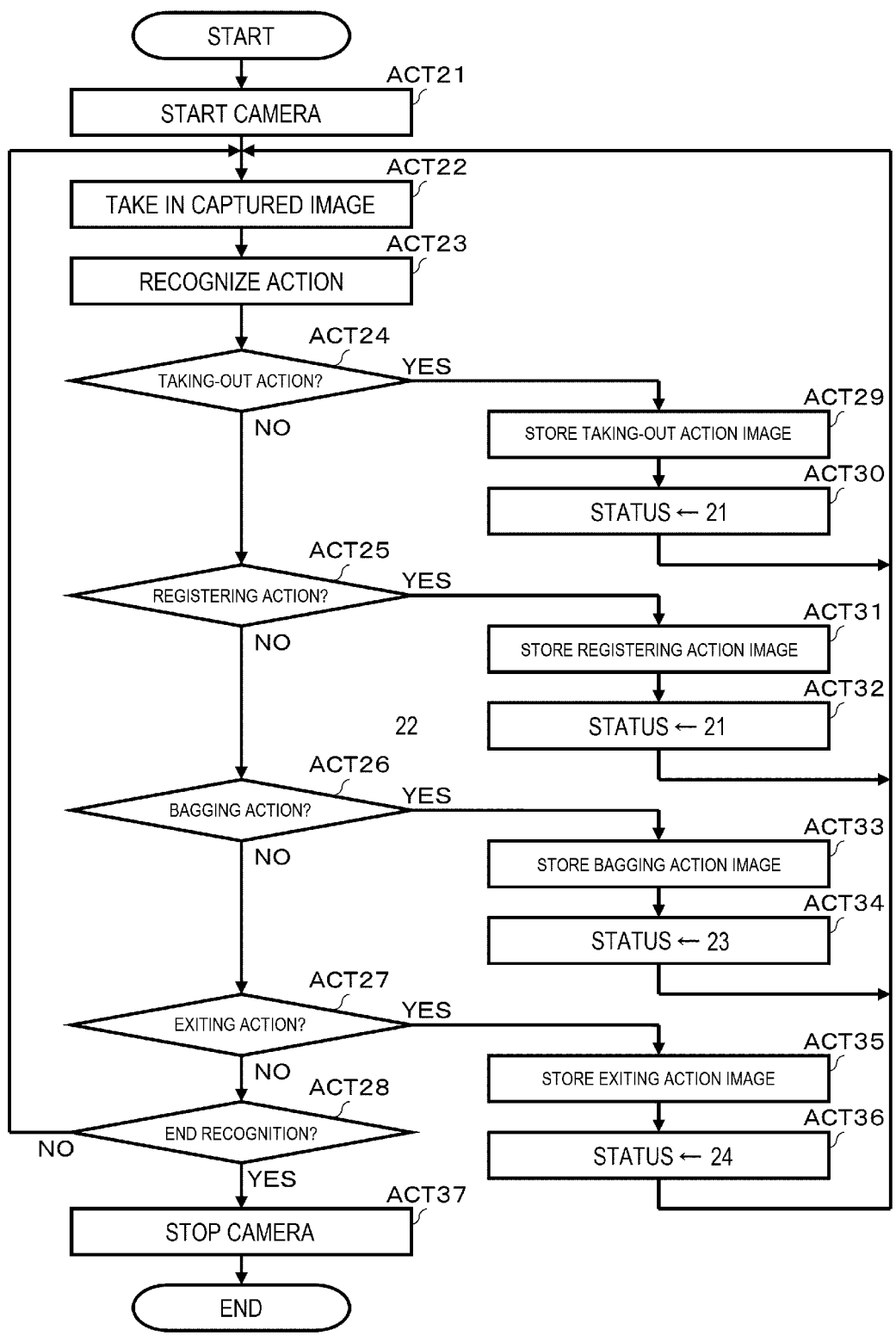
FIG. 9 is a flowchart for explaining a function of an action recognizing unit.

FIG. 9 is a flowchart for explaining the function of the action recognizing unit 512. Upon starting the function of the action recognizing unit 512, the processor 51 outputs a start signal to the camera 60 in ACT 21. The camera 60 starts imaging in response to the start signal. In ACT 22, the processor 51 takes in a captured image from the camera 60. The captured image may be a still image or may be a moving image. In ACT 23, the processor 51 recognizes, based on the captured image(s), an action of the settler in front of the self-service POS terminal 10. Specifically, the processor 51 estimates a general skeletal position (skeleton estimation) of the settler from a captured image. The processor 51 performs the skeleton estimation using an AI technology such as deep learning. The processor 51 in this example is capable of recognizing a taking-out action, a registering action, a bagging action, and an exiting action using, for example, movement(s) of a body part (e.g., a hand) as obtained by the skeleton estimation. The function of the action recognizing unit 512 may be realized by detecting a motion of the settler in a series of images.

The taking-out action is an action of the settler taking out an item from a shopping basket on the first commodity placing table 102. For example, an action of a customer taking out an item from the shopping basket placed on the first commodity placing table 102 and then putting the item in a pocket (e.g., not bagging the item) is also a kind of taking-out action. The registering action is an action of the settler holding a barcode attached to a commodity over the reading window of the scanner 14 and causing the scanner 14 to read the barcode. The bagging action is an action of the settler placing an item in a storage body on the second commodity placing table 103. An action of placing an item on the second commodity placing table 103 or the temporary placing table 104 without storing the item in the storage body is also a kind of the bagging action. The exiting action is an action of the settler leaving the front of the self-service POS terminal 10 and exiting the checkout place.

In ACT 24, the processor 51 checks whether the taking-out action is recognized. If the taking-out action is not recognized in ACT 24, the processor 51 checks whether the registering action is recognized in ACT 25. If the registering action is not recognized in ACT 25, the processor 51 checks whether the bagging action is recognized in ACT 26. If the bagging action is not recognized in ACT 26, the processor 51 checks whether the exiting action is recognized in ACT 27. If the exiting action is not recognized in ACT 27, the processor 51 checks whether to end the action recognition in ACT 28. The end of the action recognition is notified as a function of the operation recognizing unit 511. If not ending the action recognition in ACT 28, the processor 51 returns to ACT 22.

In this way, until the end of the action recognition is notified, the processor 51 sequentially takes in a captured image (or images) from the camera 60 and recognizes an action of the settler based on the captured image(s).

If recognizing the taking-out action, the processor 51 proceeds to ACT 29. In ACT 29, the processor 51 stores, in the image memory 521, together with the imaging (or acquisition) time thereof, a plurality of frame images in which the taking-out action can be successfully recognized. An image in which the taking-out action can be successfully recognized is an image in which a movement of a hand at the time when the settler takes out an item from a shopping bag is imaged. In ACT 30, the processor 51 acquires, as a transition time, the time clocked by the timepiece 54 and stores a status "21" in the state memory 522 in correlation with the transition time. The status "21" indicates the taking-out action of the settler was recognized.

Upon finishing the processing in ACT 30, the processor 51 returns to ACT 22. The processor 51 takes in a captured image (moving image) with the camera 60 again and attempts to recognize an action of the settler based on the captured image(s). If the registering action is recognized, the processor 51 proceeds to ACT 31. In ACT 31, the processor 51 stores, in the image memory 521, together with the imaging time, a plurality of frame images in which the registering action can be successfully recognized. An image in which the registering action can be successfully recognized is an image in which a movement of a hand at the time when the settler holds an item over the reading window of the scanner 14 is imaged. In ACT 32, the processor 51 acquires, as a transition time, the time clocked by the timepiece 54 and stores a status "22" in the state memory 522 in correlation with the transition time. The status "22" indicates the registering action of the settler was recognized.

Upon finishing the processing in ACT 32, the processor 51 returns to ACT 22. The processor 51 takes in a captured image (moving image) from the camera 60 again and attempts to recognize an action of the settler based on the captured image(s). If the bagging action is recognized, the processor 51 proceeds to ACT 33. In ACT 33, the processor 51 stores, in the image memory 521, together with imaging time, a plurality of frame images in which the bagging action can be successfully recognized. An image in which the bagging action can be successfully recognized is an image in which a movement of a hand when the settler places an item in a storage body is imaged or an image in which a movement of a hand when the settler places the item on the second commodity placing table 103 or the temporary placing table 104 is imaged. In ACT 34, the processor 51 acquires, as a transition time, the time clocked by the timepiece 54 and stores a status "23" in the state memory 522 in correlation with the transition time. The status "23" indicates the bagging action of the settler was recognized.

If finishing the processing in ACT 33 and ACT 34, the processor 51 returns to ACT 22. The processor 51 sequentially takes in a captured image (moving image) by the camera 60 again and recognizes an action of the settler based on the captured image. As a result, if recognizing the exiting action, the processor 51 proceeds to ACT 35. In ACT 35, the processor 51 stores, in the image memory 521, together with imaging time thereof, a plurality of frame images in which the exiting action is successfully recognized. An image in which the exiting action can be successfully recognized is an image in which a movement of the settler away from the front of the self-service POS terminal 10 is imaged. In ACT 36, the processor 51 acquires, as the transition time, the time clocked by the timepiece 54 and stores a status "24" in the state memory 522 in correlation with the transition time. The status "24" indicates the exiting action of the settler was recognized.

Upon finishing the processing in ACT 36, the processor 51 returns to ACT 22. The processor 51 sequentially takes in another captured image (moving image) from the camera 60 again and attempts to recognize an action of the settler based on the captured image(s). If the taking-out action, the registering action, the bagging action, or the exiting action is recognized, the processor 51 respectively executes the processing in ACT 29 to ACT 36 in the same manner as explained above.

If the end of the action recognition is notified, the processor 51 proceeds to ACT 37 after ACT 28. In ACT 37, the processor 51 outputs a stop signal to the camera 60. The camera 60 ends the imaging in response to the stop signal. Then, the processor 51 ends the function of the action recognizing unit 512 at this time.

The functions of the operation recognizing unit 511 are further explained.

Figure 15:
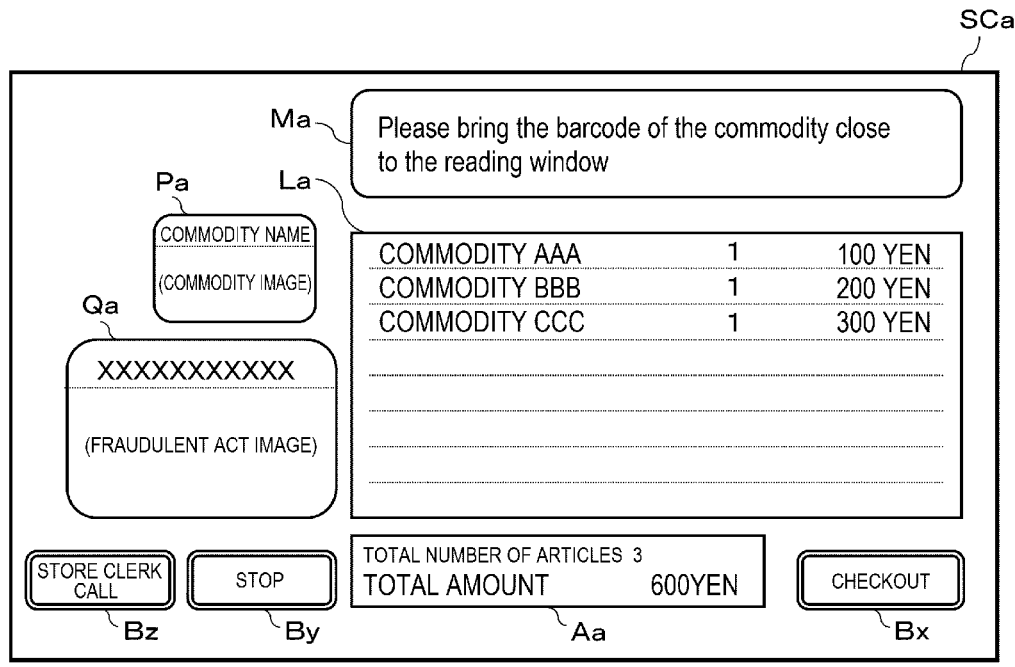
FIG. 15 depicts an example of a commodity registration screen.

If the settler touches the start key on the settlement start screen, the screen of the touch panel 11 is switched from the settlement start screen to a commodity registration screen SCa (see FIG. 15).

FIG. 15 is an example of the commodity registration screen Sca. As illustrated, the commodity registration screen Sca includes a message display region Ma, a list display region La, a total display region Aa, a registered commodity image display region Pa, a fraud specifying image display region Qa, a checkout key Bx, a stop key By, and a store clerk call key Bz.

In the message display region Ma, for example, "Please bring the barcode of the item close to the reading window" is displayed as a message indicating an operation method for commodity registration. In the list display region La, commodity names, the numbers of articles, prices, and the like of registered commodities are displayed in a list format. In the total display region Aa, a total number of articles and a total amount of the registered commodities are displayed. In the registered commodity image display region Pa, an image of a commodity (item) registered for purchase is displayed. In the fraud specifying image display region Qa, an image for specifying a fraudulent act successfully acquired by the function of the image acquiring unit 514 and a warning message are displayed. The checkout key Bx is a soft key for the settler finishing registering items to request a checkout start. The stop key By is a soft key for the settler to stop the registration of items. The store clerk call key Bz is a soft key for the settler to call a store clerk.

Figure 16:
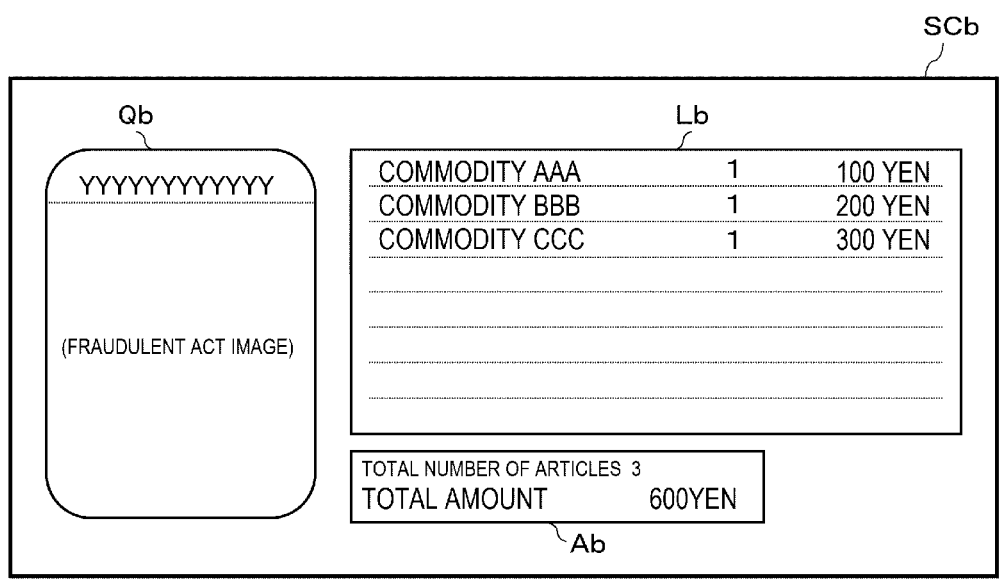
FIG. 16 depicts an example of a screen in an attendant terminal.

FIG. 16 is an example of a screen SCb displayed on the display device of the attendant terminal 20 with respect to the self-service POS terminal 10 on which the commodity registration screen Sca illustrated in FIG. 15 is displayed. On the display device of the attendant terminal 20, a plurality of screens SCb respectively corresponding to the commodity registration screens Sca of the self-service POS terminals 10 are divided and displayed.

The screen SCb includes a list display region Lb, a total display region Ab, and a fraud specifying image display region Qb. In the list display region Lb, the same content as the content displayed in the list display region La of the commodity registration screen Sca is displayed. In the total display region Ab, the same content as the content displayed in the total display region Aa of the commodity registration screen Sca is displayed. In the fraud specifying image display region Qb, the same content as the content displayed in the fraud specifying image display region Qa of the commodity registration screen Sca is displayed. However, whereas the warning message displayed in the fraud specifying image display region Qa is a message for a settler, that is, a customer, a warning message displayed in the fraud specifying image display region Qb is a message for an attendant, that is, a store clerk.

In ACT 5, the processor 51 notifying the action recognition start in ACT 4 in FIG. 8 waits for operation input data from the self-service POS terminal 10. As the operation input data, there is data relating to item registration events, user selections for an instruction to stop registration, start checkout, or the like. The operation input data relating to an item registration can be data of an item identified by a barcode scanned by the scanner 14 in response to operation of the settler holding the barcode of the item over the reading window. At least a commodity name is included in the data of the item. The operation input data relating to the instruction to stop registration can be provided as a stop key signal output from the self-service POS terminal 10 in response to the settler touching the stop key By of the commodity registration screen Sca. The operation input data relating to an instruction to start checkout can be provided as a checkout key signal output from the self-service POS terminal 10 in response to the settler touching the checkout key Bx of the commodity registration screen Sca.

If the operation input data is received from the self-service POS terminal 10, the processor 51 checks, in ACT 6, whether the data relates to a commodity registration. ACT 7, the processor 51 checks whether an instruction to stop registration has been received. In ACT 8, the processor 51 checks whether the instruction to start checkout has been received. If some other type of operation input data is received, the processor 51 returns to ACT 5 and waits for the next operation input data.

If the operation input data relating to the commodity registration is input in the operation input data waiting state in ACT 5 to ACT 8, the processor 51 proceeds to ACT 9. In ACT 9, the processor 51 acquires, as the registration time, the time clocked by the timepiece 54 and stores a status "12" in the state memory 522 in correlation with the registration time. The status "12" indicates a commodity registration event was recognized.

In ACT 10, the processor 51 acquires a registered commodity image. For example, the processor 51 segments an image of an item from a plurality of frame images in which the registering action can be successfully recognized, the plurality of frame images being stored in the Image memory 521 immediately preceding registration time, and acquires the image of the item as the registered commodity image. The image of the item is an image of an object being held over the reading window by the settler. The image of the item may include a part of a hand of the settler. If data of a preset commodity image is included in the data relating to the commodity (item) registration, the registered item image may be a commodity image that is included in the operation input data. In ACT 11, the processor 51 stores, in the list memory 523, a commodity name relating to the commodity registration along with the registered commodity image in correlation with the registration time. Thereafter, the processor 51 returns to ACT 5 and waits for the next operation input data.

If the operation input data relating to the registration stop is input in the operation input data waiting state in ACT 5 to ACT 8, the processor 51 proceeds to ACT 12 from ACT 7. In ACT 12, the processor 51 acquires, as the registration stop time, the time clocked by the timepiece 54 and stores a status "15" in the state memory 522 in correlation with the registration stop time. The status "15" indicates a commodity registration stop was recognized.

In ACT 13, the processor 51 notifies an action recognition end. The processor 51 ends the function of the action recognizing unit 512 after the notification. In ACT 14, the processor 51 stores data of the state memory 522 in the auxiliary storage device 53. Then, the processor 51 ends the function as the operation recognizing unit 511.

If operation input data relating to a checkout start is input in the operation input data waiting state in ACT 5 to ACT 8, the processor 51 proceeds to ACT 15 from ACT 8. In ACT 15, the processor 51 acquires, as the checkout start time, the time clocked by the timepiece 54 and stores a status "13" in the state memory 522 in correlation with the checkout start time. The status "13" indicates a checkout start was recognized.

In ACT 16, the processor 51 waits for checkout end data. The checkout end data is data output from the self-service POS terminal 10 once a selection input for a payment method is received and payment by the selected payment method is completed at the self-service POS terminal 10. If the checkout end data is input, the processor 51 proceeds to ACT 17. In ACT 17, the processor 51 acquires, as the checkout end time, the time clocked by the timepiece 54 and stores a status "14" in the state memory 522 in correlation with the checkout end time. The status "14" indicates a checkout end was recognized.

Thereafter, the processor 51 proceeds to ACT 13 explained above. That is, the processor 51 notifies an action recognition end. The processor 51 stores data of the state memory 522 in the auxiliary storage device 53. Then, the processor 51 ends the function as the operation recognizing unit 511.

Each time the operation input data indicating a new use start is input from the self-service POS terminal 10, the processor 51 executes the processing of the operation recognizing unit 511 as indicated by ACT 1 to ACT 17 in FIG. 8. The processor 51 executes the processing of the action recognizing unit 512 as indicated by ACT 21 to ACT 37 in FIG. 9. Consequently, for each settler who performs settlement by himself or herself using the self-service POS terminal 10, data of the state memory 522 in which various statuses are stored in time series is stored in the auxiliary storage device 53. Therefore, by analyzing the data of the state memory 522, it is possible to verify an operation history by the settler and an action history of the settler.

The monitoring apparatus 50 prevents fraud by detecting fraud by a settler in real time, then warning the settler, and/or notifying an attendant. Such a fraud preventing function is realized by the fraud detecting unit 513, the image acquiring unit 514, and the output unit 515 operating in conjunction.

Figure 10:
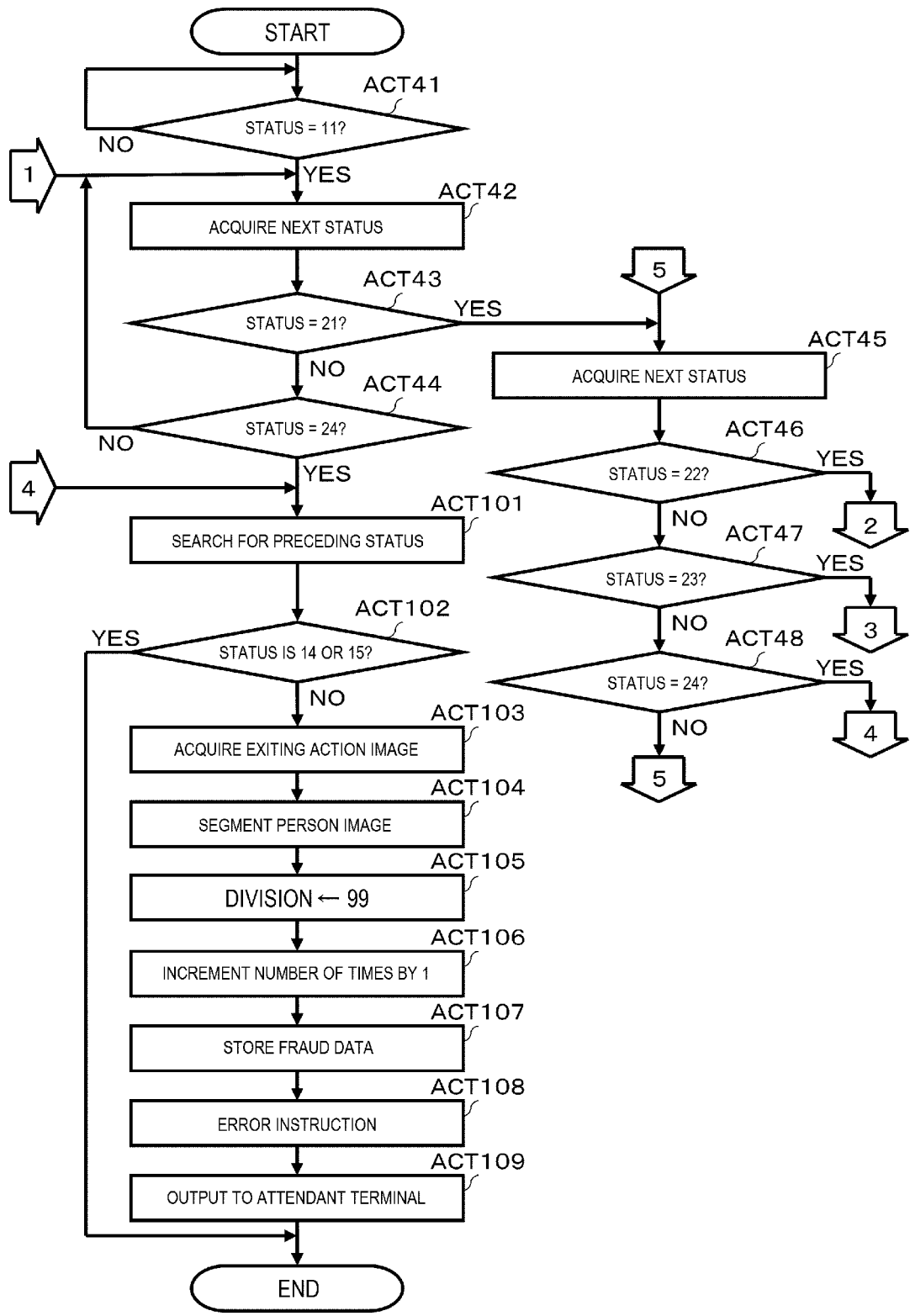
FIG. 10 is a flowchart for explaining functions of a fraud detecting unit, an image acquiring unit, and an output unit.

FIGS. 10 to 14 are flowcharts for explaining the functions of the fraud detecting unit 513, the image acquiring unit 514, and the output unit 515. In FIG. 10, in ACT 41, the processor 51 waits for the status "11" to be stored in the state memory 522.

When the status "11" is stored in the state memory 522, the processor 51 proceeds to ACT 42. In ACT 42, the processor 51 acquires the next status data from the state memory 522. The processor 51 waits for the status "21" to be acquired in ACT 43 or the status "24" to be acquired in ACT 44. That is, upon recognizing the use start by a settler, the processor 51 waits for either a taking-out action or an exiting action of the settler to be recognized.

If acquiring the status "21" in the waiting state in ACT 43 and ACT 44, the processor 51 proceeds to ACT 45. In ACT 45, the processor 51 acquires the next status data from the state memory 522. The processor 51 waits for the status "22" to be acquired in ACT 46, the status "23" to be acquired in ACT 47, or the status "24" to be acquired in ACT 48. That is, after recognizing the taking-out action of the settler, the processor 51 then waits for the registering action, the bagging action, or the exiting action.

Figure 11:
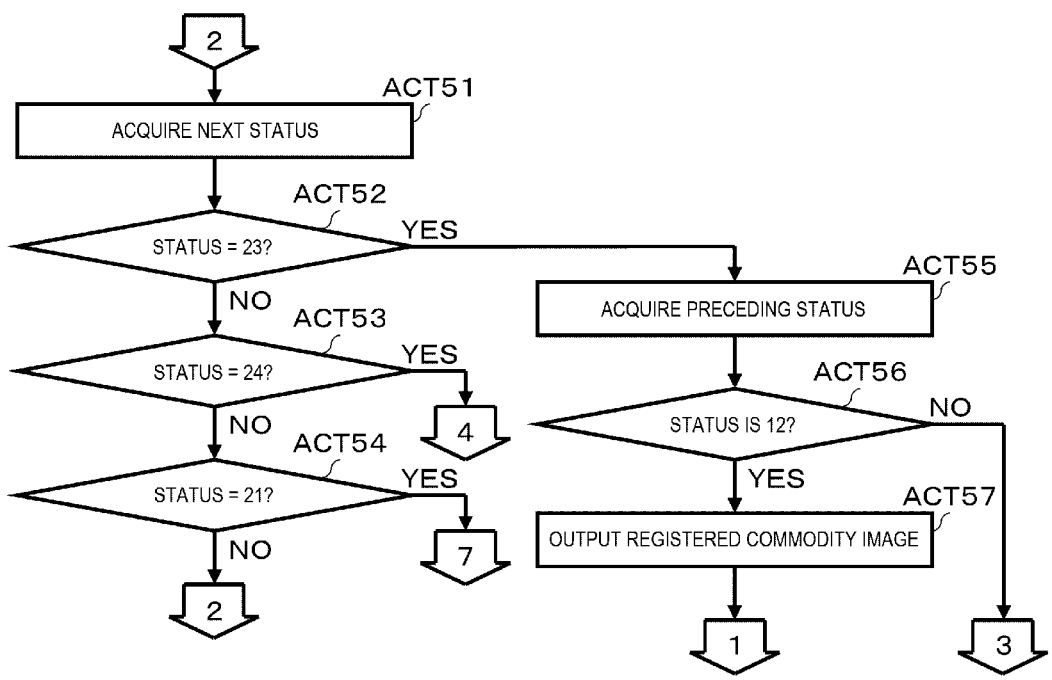
FIG. 11 is a flowchart for explaining functions of a fraud detecting unit, an image acquiring unit, and an output unit.

If acquiring the status "22" in the waiting state in ACT 46 to ACT 48, the processor 51 proceeds to ACT 51 in FIG. 11. In ACT 51, the processor 51 acquires the next status data from the state memory 522. The processor 51 waits for the status "23" to be acquired in ACT 52, the status "24" to be acquired in ACT 53, or the status "21" to be acquired in ACT 54. That is, after recognizing a registering action of the settler, the processor 51 waits for a bagging action, an exiting action, or a taking-out action.

If acquiring the status "23" in the waiting state in ACT 52 to ACT 54, the processor 51 proceeds to ACT 55. In ACT 55, the processor 51 acquires the status that was stored immediately before the status "23" from the state memory 522. In ACT 56, the processor 51 checks whether the status stored immediately before the status "23" is "12". That is, the processor 51 checks whether a commodity registration event was recognized before the bagging action. If the status "12" is stored immediately before the status 23, the processor 51 proceeds to ACT 57. In ACT 57, the processor 51 outputs the latest commodity registration image stored in the list memory 523 to the self-service POS terminal 10. Consequently, at the self-service POS terminal 10, the commodity registration image is displayed in the registered commodity image display region Pa of the commodity registration screen sCa. The image is an image of an item registered by the settler by causing the scanner 14 of the self-service POS terminal 10 to read a barcode.

The processor 51 after finishing the processing in ACT 57 returns to ACT 42 in FIG. 10. The processor 51 executes the processing in ACT 42 and subsequent acts in the same manner as explained above.

In this way, the processor 51 recognizes the taking-out action of the settler then monitors whether an item registration occurs next. If a bagging action then occurs next after the item registration, the processor 51 finds that fraud is absent. The processor 51 outputs the image of the item subjected to the registration processing to the self-service POS terminal 10.

Cases in which a fraud of the settler is recognized is explained.

First, a fraud in which the settler pretends to perform a registering action for an item but then bags the item without actually registering the item is explained. Such a fraud occurs, for example, if the settler performs an action of hiding a barcode with a hand and holding the item over the reading window of the scanner 14. In that case, the status "22" (indicating a registering action) followed by the status "21" (indicating a taking-out action) and then the status "23" (indicating the bagging action is stored in the state memory 522. However, the status "12" (indicating to an item registration) will not be stored between the status "22" and the status "23" in this scenario. That is, this corresponds to the case in which the status stored immediately before the status "23" is not "12" for ACT 56 in FIG. 11 (NO in ACT 56).

Figure 12:
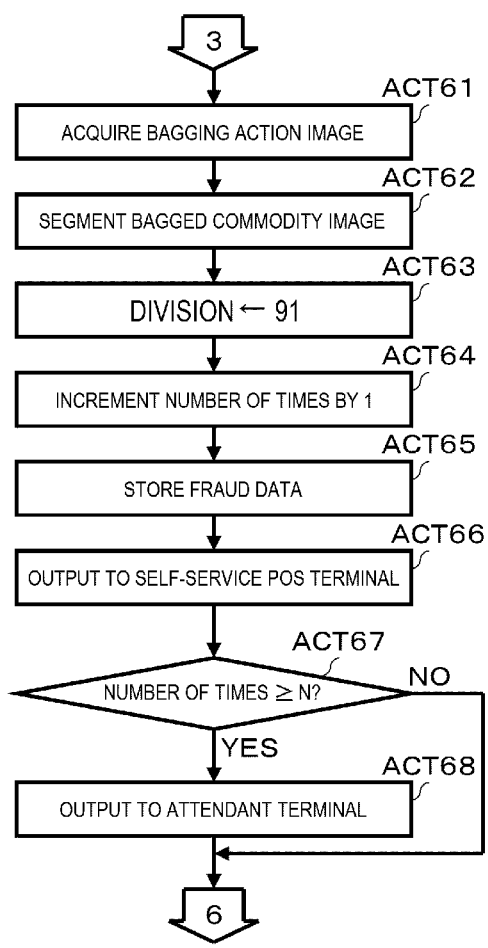
FIG. 12 is a flowchart for explaining functions of a fraud detecting unit, an image acquiring unit, and an output unit.

The processor 51 proceeds to ACT 61 in FIG. 12. In ACT 61, the processor 51 acquires a bagging action image. Specifically, the processor 51 acquires a plurality of frame images in which the bagging action can be successfully recognized, the plurality of frame images being stored in the image memory 521 before and after the transition time of the status "23". In ACT 62, the processor 51 segments, from the acquired frame images, as an image for specifying a fraudulent act, an image capable of specifying an item bagged by the bagging action. For example, the processor 51 segments an image of an item held in a hand by the settler. For example, the processor 51 segments an image of an item placed on the second commodity placing table 103 or the temporary placing table 104 by the settler.

The processor 51 functions as the fraud detecting unit 513 according to the processing in ACT 56 in FIG. 11. The processor 51 functions as the image acquiring unit 514 according to the processing in ACT 61 and ACT 62 in FIG. 12.

In ACT 63, the processor 51 finishing the processing in ACT 62 sets a fraud division to "91". The fraud division "91" is information indicating a fraud of commodity nonregistration. In ACT 64, the processor 51 increases a counter value ("a counter") by 1. The counter is reset to "0" if the memories are initialized in ACT 2 in FIG. 8.

In ACT 65, the processor 51 stores fraud data in the fraud memory 524. That is, the processor 51 sets, as the recognition time of the fraud, the present time clocked by the timepiece 54. The processor 51 stores, in the fraud memory 524, the fraud division as determined in ACT 63, a value of the counter as updated in ACT 64, the image for specifying the fraudulent act (the fraud recognition image) as acquired in ACT 62 in correlation with the recognition time.

In ACT 66, the processor 51 outputs the fraud recognition image and a warning message for the settler corresponding to the determined fraud division ("91") to the self-service POS terminal 10. Consequently, at the self-service POS terminal 10, the fraud recognition image and the warning message for the settler are displayed in the fraud specifying image display region Qa of the commodity registration screen SCa. The warning message has content for notifying that, for example, the item in the image is not registered or a reregistration of the item is necessary such as "The item is not registered. Please register the item again". In this way, for the settler who performs the registration action for the item and then performs the bagging action while actually leaving the item unregistered, the fraud recognition image and the warning message will be displayed in the fraud specifying image display region Qa.

In ACT 67, the processor 51 checks whether the counter value is equal to or larger than a threshold N. If the counter value ("number of times") is equal to or greater than the threshold N, the processor 51 proceeds to ACT 68. In ACT 68, the processor 51 outputs the fraud recognition image and a warning message for the attendant corresponding to the determined fraud division ("91") to the attendant terminal 20. Consequently, at the attendant terminal 20, the fraud recognition image and the warning message for the attendant are displayed in the fraud specifying image display region Qb of the screen SCb corresponding to the particular self-service POS terminal 10. The warning message has content for notifying the attendant that the fraud of item nonregistration occurs such as "Nonregistration has occurred". In this way, if the settler commits frauds N times or more, this is reported to the attendant terminal 20.

The threshold N can be any value equal to or larger than "1". For example, if every detected fraudulent act is to be notified to the attendant terminal 20, the threshold N is set to "1". If three or more detected fraudulent acts are considered necessary before notification to the attendant terminal 20, the threshold N is set to "3". By setting the threshold N to greater than "1" burden on the attendant at the attendant terminal 20 is reduced. However, this increases the chance that a fraudulent act will not be addressed by the attendant.

The processor 51 functions as the output unit 515 according to the processing in ACT 66 to ACT 68.

Figure 13:
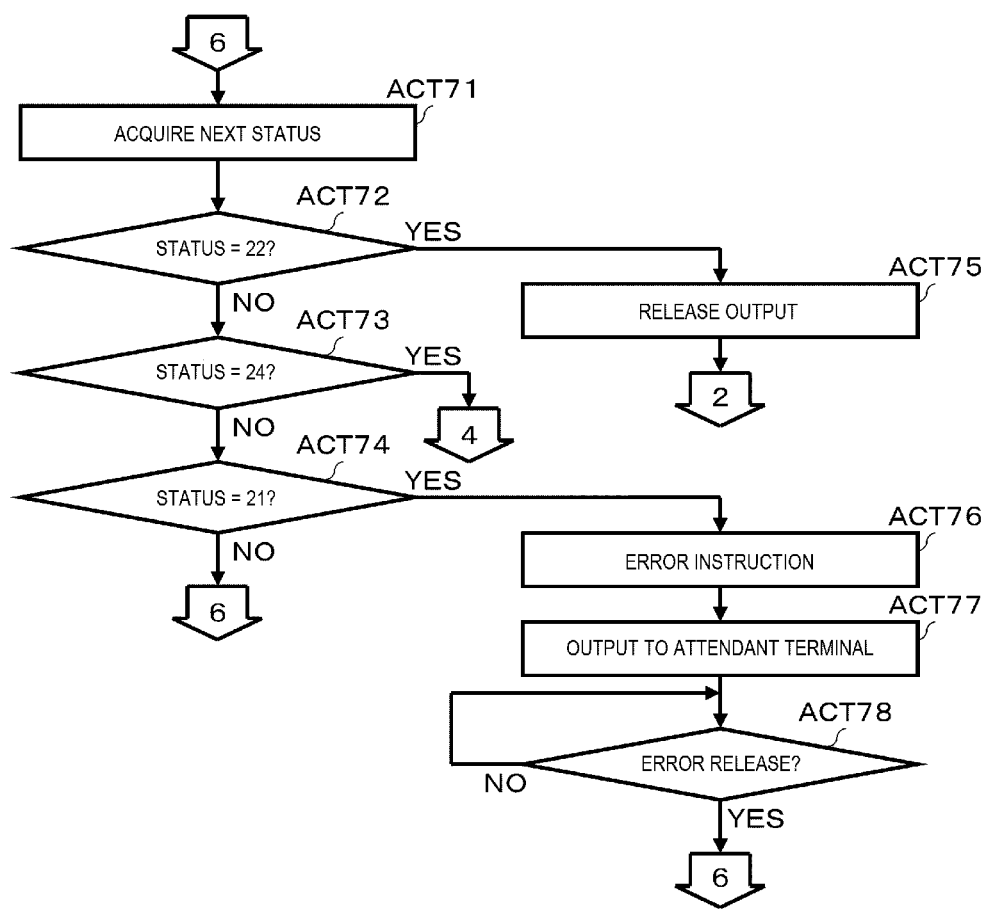
FIG. 13 is a flowchart for explaining functions of a fraud detecting unit, an image acquiring unit, and an output unit.

If the counter value is less than the threshold N or the processor 51 outputs the fraud recognition image and the warning message to the attendant terminal 20 because the counter value is greater than or equal to the threshold N, the processor 51 proceeds to ACT 71 in FIG. 13. In ACT 71, the processor 51 acquires the next status data from the state memory 522. In ACT 72, the processor 51 waits for the status "22" to be acquired, in ACT 73, the processor 51 waits for the status "24" to be acquired, or, in ACT 74, the processor 51 waits for the status "21" to be acquired. That is, upon detecting the fraudulent act of item nonregistration, the processor 51 waits for the registering action of the settler to be recognized, the exiting action of the settler to be recognized, or the taking-out action of the settler to be recognized.

When curing a detected item nonregistration, the settler checks the fraud recognition image and the warning message displayed in the fraud specifying image display region Qa of the commodity registration screen SCa and then takes out the item specified by the fraud recognition image from the second commodity placing table 103 and performs the registering action. That is, this corresponds to the case in which the status "22" is acquired (YES in ACT 72) in the waiting state in ACT 72 to ACT 74 in FIG. 13.

The processor 51 proceeds to ACT 75. In ACT 75, the processor 51 releases the output of the fraud recognition image and the warning message. Consequently, at the self-service POS terminal 10, the display in the fraud specifying image display region Qa is erased. In the attendant terminal 20, the display in the fraud specifying image display region Qb is erased.

If finishing the processing in ACT 75, the processor 51 proceeds to ACT 51 in FIG. 11. The processor 51 executes the processing in ACT 51 and subsequent acts in the same manner as explained above.

Therefore, if the barcode of the item is read by the scanner 14 according to the registering action of the settler, the status "12" is stored after the status "22" in the state memory 522. The status "23" is stored in the state memory 522 according to the subsequent bagging action of the settler. As a result, the processor 51 sequentially executes the processing in ACT 51, ACT 55, and ACT 57 and returns to ACT 42 in FIG. 10. That is, the nonregistration fraud is cured/corrected.

On the other hand, it is possible that the settler repeats a fraudulent act of taking out the next item from a shopping basket placed on the first commodity placing table 102 without curing the previous the nonregistration. This corresponds to the case in which the status "21" is acquired (YES in ACT 74) in the waiting state in ACT 72 to ACT 74 in FIG. 13.

The processor 51 proceeds to ACT 76. In ACT 76, the processor 51 outputs an error instruction to the self-service POS terminal 10. The self-service POS terminal 10 then changes to an error state to be inoperable. The error state is not released unless an error release operation by the attendant is performed.

In ACT 77, the processor 51 outputs an error signal to the attendant terminal 20. The error signal includes the fraud recognition image acquired in ACT 62 and the warning message for the attendant corresponding to the fraud division "91". The attendant terminal 20 to which the error signal is input displays the fraud recognition image and the warning message for the attendant in the fraud specifying image display region Qb of the screen SCb corresponding to the self-service POS terminal 10. The attendant terminal 20 informs the attendant that the error occurs at the self-service POS terminal 10. An informing method is not limited. For example, the error may be informed by lighting of a lamp or may be informed by sounding of error sound. The attendant checking the fraud content and the error goes to the place of the self-service POS terminal 10 and tells the settler to cure the fraud. The attendant performs operation for releasing the error. When the error is released, an error release signal is output from the self-service POS terminal 10 to the monitoring apparatus 50.

In ACT 78, the processor 51 outputting the error instruction and the error signal waits for the error release signal. Upon receiving the error release signal via the terminal interface 56, the processor 51 returns to ACT 71. Therefore, the settler cannot proceed to the next item registration unless the settler cures the nonregistration by appropriately registering the item.

A fraud type in which the settler performs a registering action on an item without actually registering the item and then takes out the next item before bagging the previous item. Such a fraud occurs, for example, if the settler hides (blocks) a barcode with a hand, holds the barcode over the scanner 14, and places the item on the floor or the like without bagging the item. In such a case, the status "22" (indicating the registering action) is stored next to (immediately after) the status "21" (indicating the taking-out action). However, the status "23" (indicating the bagging action) is not stored after status "22" and the status "21" (indicating the taking-out action) will be stored again. That is, this corresponds to the case in which the status "21" is stored (YES in ACT 54) in the waiting state in ACT 52 to ACT 54 in FIG. 11.

Figure 14:
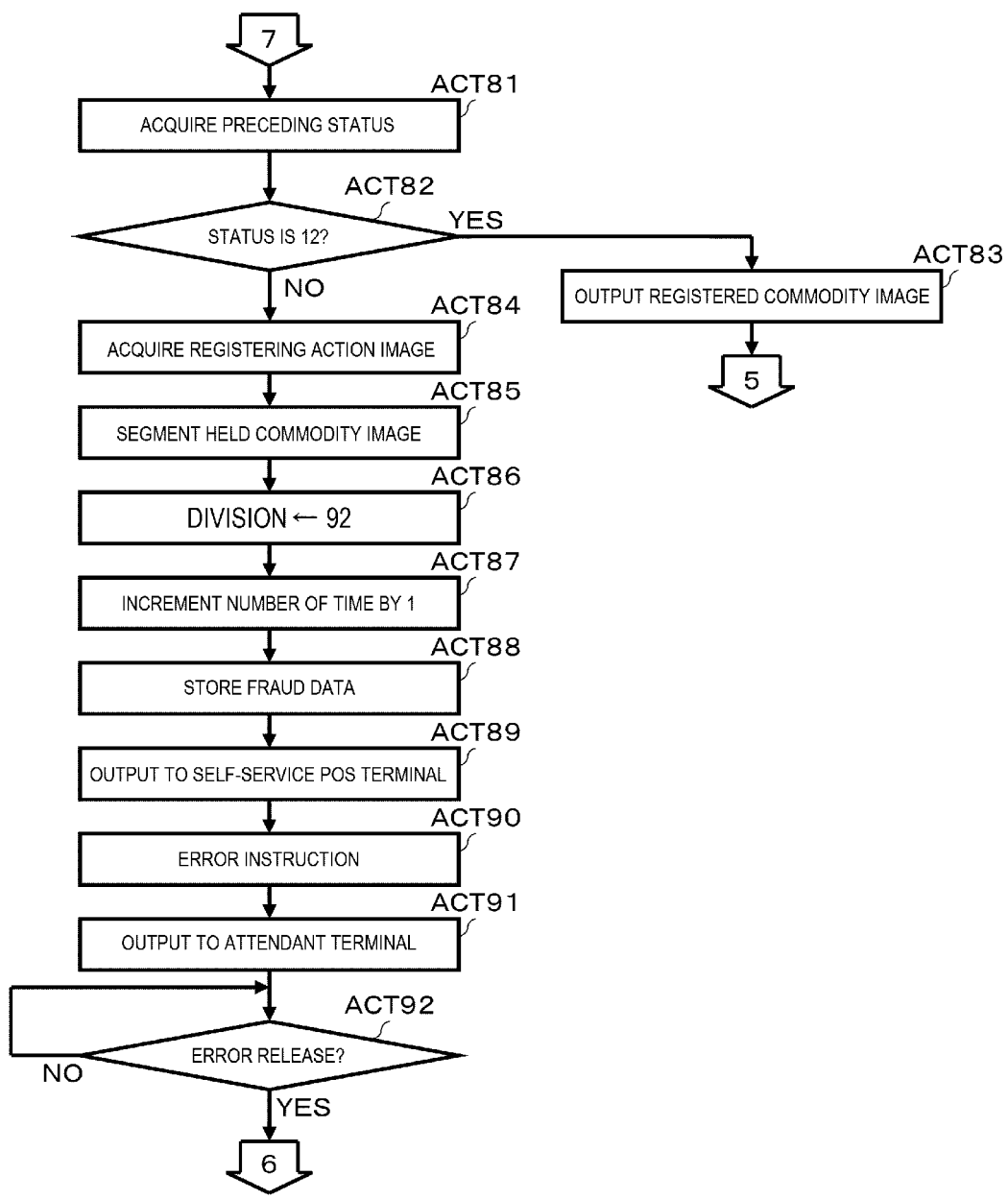
FIG. 14 is a flowchart for explaining functions of a fraud detecting unit, an image acquiring unit, and an output unit.

The processor 51 proceeds to ACT 81 in FIG. 14. In ACT 81, the processor 51 acquires a status stored immediately before the status "21" from the state memory 522. In ACT 82, the processor 51 checks whether the status stored immediately before the status "21" is "12". That is, the processor 51 checks whether operation input data relating to the item registration is recognized before the taking-out action of the settler. If the status "12" is stored, an item not bagged is correctly registered and there is no fraud. In this case, the processor 51 proceeds to ACT 83. In ACT 83, the processor 51 outputs the latest commodity registration image stored in the list memory 523 to the self-service POS terminal 10. Consequently, at the self-service POS terminal 10, the item registration image is displayed in the registered commodity image display region Pa of the commodity registration screen SCa.

The processor 51 finishing the processing in ACT 83 returns to ACT 45 in FIG. 10. That is, the processor 51 proceeds to the same processing as the processing executed if the status "21" is acquired in ACT 43. The processor 51 executes the processing in ACT 45 and subsequent act in the same manner as explained above.

On the other hand, if the status stored immediately before the status "21" is not "12" in ACT 82, unbagged item is not registered. In this case, the processor 51 proceeds to ACT 84. In ACT 84, the processor 51 acquires a registering action image. Specifically, the processor 51 acquires a plurality of frame images in which the registering action can be successfully recognized, the plurality of frame images being stored in the image memory 521 before and after transition time of the status "22" and immediately before the status "21". In ACT 85, the processor 51 segments, from the acquired frame images, as an image for specifying a fraudulent act, an image capable of specifying an item held over the reading window by the registering action. For example, the processor 51 segments an image of an item that the settler holds with a hand held up over the reading window.

The processor 51 functions as the fraud detecting unit 513 according to the processing in ACT 82 in FIG. 14. The processor 51 functions as the image acquiring unit 514 according to the processing in ACT 84 and ACT 85 in FIG. 14.

In ACT 86, the processor 51 finishing the processing in ACT 85 sets the fraud division to "92". The fraud division "92" is information indicating a fraud of commodity non-registration and no bagging. In ACT 87, the processor 51 increases the counter value by 1.

In ACT 88, the processor 51 stores fraud data in the fraud memory 524. That is, the processor 51 sets, as recognition time of the fraud, present time clocked by the timepiece 54. The processor 51 stores, in the fraud memory 524, the fraud division as determined in ACT 86, a value of the counter as updated in ACT 87, and the image for specifying the fraudulent act (fraud recognition image) as acquired in ACT 85 in correlation with the recognition time.

In ACT 89, the processor 51 outputs the fraud recognition image and a warning message for the settler corresponding to the determined fraud division ("92") to the self-service POS terminal 10. Consequently, at the self-service POS terminal 10, the fraud recognition image and the warning message for the settler are displayed in the fraud specifying image display region Qa of the commodity registration screen SCa. The warning message has content for notifying that, for example, an item is not registered and registration of an unbagged item is necessary such as "The item is not registered. Please reregister the unbagged item commodity".

In ACT 90, the processor 51 outputs an error instruction to the self-service POS terminal 10. The self-service POS terminal 10 to which the error instruction is input changes to an error state to be inoperable. The error state is not released unless error releasing operation by the attendant is performed.

In ACT 91, the processor 51 outputs an error signal to the attendant terminal 20. The error signal includes the fraud recognition image acquired in ACT 85 and a warning message for the attendant corresponding to the fraud division "92". The attendant terminal 20 to which the error signal is input displays the fraud recognition image and the warning message for the attendant in the fraud specifying image display region Qb of the screen SCb corresponding to the self-service POS terminal 10. The attendant terminal 20 informs the attendant that the error occurs at the self-service POS terminal 10. An informing method is not particularly limited. For example, the error may be indicated by lighting of a lamp or by sounding of error sound (e.g., a buzzer). The attendant checking for fraud or error goes to the self-service POS terminal 10 and tells the settler to cure the fraud/error. The attendant may then perform an operation for releasing the error. When the error is released, an error release signal is output from the self-service POS terminal 10 to the monitoring apparatus 50.

The processor 51 functions as the output unit 515 according to the processing in ACT 89 and ACT 91.

In ACT 92, the processor 51 waits for the error release signal. If receiving the error release signal via the terminal interface 56, the processor 51 returns to ACT 71 in FIG. 13. Therefore, the settler cannot register the next item unless the settler performs operation for curing the unregistered, unbagged item.

Subsequently, a fraud in which the settler performs the bagging action without performing the registering action about an item taken out from a shopping basket is explained. In this case, the status "23" (indicating the bagging action) is stored next to (immediately after) the status "21" (indicating the taking-out action). That is, this corresponds to the case in which the status "23" is acquired (YES in ACT 47) in the waiting state in ACT 46 to ACT 48 in FIG. 10.

The processor 51 proceeds to ACT 61 in FIG. 12. The processor 51 executes the processing in ACT 61 to ACT 68 and the processing in ACT 71 and subsequent acts in FIG. 13 in the same manner as explained above. That is, the processor 51 acquires a bagging action image and segments an image for specifying a fraudulent act from the image. The processor 51 stores fraud data in the fraud memory 524. The processor 51 outputs the fraud recognition image and the warning message for the settler corresponding to the fraud division "91" to the self-service POS terminal 10. If the counter value is equal to or larger than the threshold N, the processor 51 outputs the fraud recognition image and the warning message for the attendant corresponding to the fraud division "91" to the attendant terminal 20.

Consequently, at the self-service POS terminal 10, the image of the item for which the settler performs the bagging action without performing the registering action is displayed as the fraud recognition image and the warning message for the settler is displayed in the fraud specifying image display region Qa of the commodity registration screen SCa. In this way, for the settler who performs the bagging action without performing the registering action on the item taken out from the shopping basket, the fraud recognition image and the warning message are displayed in the fraud specifying image display region Qa of the commodity registration screen SCa. If the counter value is equal to or greater than the threshold N, the same fraud recognition image and the warning message for the attendant are displayed in the fraud specifying image display region Qb of the screen SCb corresponding to the self-service POS terminal 10 on the attendant terminal 20. In this way, if the settler commits frauds N times or more, each fraudulent act is reported to the attendant terminal 20.

Thereafter, the processor 51 waits for the status "22" to be acquired, the status "24" to be acquired, or the status "21" to be acquired as the next status data. If the status "22" is acquired, the processor 51 releases the output of the fraud recognition image and the warning message. That is, if the settler corrects the fraud of nonregistration, subsequent item registration is possible. However, if the settler takes out the next item from the shopping bag without first correcting the detected fraud, the self-service POS terminal 10 changes to an error state.

Lastly, a fraud in which the settler exits the checkout place without paying the price of an item is explained. Such a fraud is revealed if the status "24" is acquired as the next status (YES in ACT 44, ACT 48, ACT 54, or ACT 74) in the waiting state in ACT 43 or ACT 44 in FIG. 10, the waiting state in ACT 46 to ACT 48 in FIG. 10, the waiting state in ACT 52 to ACT 54 in FIG. 11, or the waiting state in ACT 72 to ACT 74 in FIG. 13.

The processor 51 proceeds to ACT 101 in FIG. 10 when the status "24" is set as described. In ACT 101, the processor 51 acquires the status stored immediately before the status "24" from the state memory 522. In ACT 102, the processor 51 checks whether the status stored immediately before the status "24" is "14" or "15". That is, the processor 51 checks whether a checkout end or a registration stop was recognized before the exiting action. If the checkout end or the registration stop was recognized before the exiting action, the exiting action may be considered a proper action. The processor 51 thus ends the function of the fraud detecting unit 513.

In contrast, if the status stored immediately before the status "24" is not "14" or "15" (relating to the checkout end or registration stop), the exiting action can be considered a fraudulent action. In ACT 103, the processor 51 acquires an exiting action image. Specifically, the processor 51 acquires a plurality of frame images in which the exiting action can be successfully recognized, the plurality of frame images being stored in the image memory 521 before and after transition time of the status "24". In ACT 104, the processor 51 segments, from the acquired frame images, an image capable of specifying an exiting person as an image for specifying the fraudulent act. For example, the processor 51 segments an image in which the face of the improperly exiting settler is imaged.

In ACT 105, the processor 51 sets the fraud division to "99". The fraud division "99" is information indicating a fraud of unpaid exit. In ACT 106, the processor 51 increases the counter value by 1. In ACT 107, the processor 51 stores fraud data in the fraud memory 524. That is, the processor 51 sets, as recognition time of the fraud, the present time clocked by the timepiece 54. The processor 51 stores, in the fraud memory 524, the fraud division determined in ACT 105, the value of the counter as updated in ACT 106, and the image for specifying the fraudulent act as acquired in ACT 104. That is, the fraud recognition image is stored in correlation with the recognition time.

In ACT 108, the processor 51 outputs an error instruction to the self-service POS terminal 10. In ACT 109, the processor 51 outputs an error signal to the attendant terminal 20. The error signal includes the fraud recognition image acquired in ACT 104 and a warning message for the attendant corresponding to the fraud division "99". The warning message has content for arousing the attendant's attention such as "A settler about to exit without checking out is present".

The processor 51 outputting the error instruction and the error signal ends the function of the fraud detecting unit 513.

[Explanation of Effects of the Monitoring Apparatus]

The monitoring apparatus 50 can achieve an effect by which it is possible to prevent a fraudulent act of a customer that could otherwise occur with use of the self-service POS terminal 10.

For example, if the settler commits a fraudulent act of bagging an unregistered item, a fraud recognition image and a warning message are displayed on the touch panel 11 of the self-service POS terminal 10. The fraud recognition image is an image capable of identifying the unregistered item bagged by the settler. The warning message has content for instructing registration of the unregistered item. By displaying the fraud recognition image together with the warning message, it is possible to achieve the fraudulent act preventing effect explained above. That is, since the fraud recognition image is displayed on the touch panel 11 together with the warning message, it is likely that other customers and store clerk learn that the fraud occurs. Moreover, since the fraud recognition image identifies the unregistered item, it is easily understood which item has been identified as left unregistered. Therefore, the settler can less easily commit a fraudulent act.

Moreover, if the settler neglects the warning message and proceeds to the registration operation for the next item, the self-service POS terminal 10 can be set as inoperable and a warning is sent to the attendant terminal 20. Therefore, the fraudulent act is not easily overlooked by the attendant.

For example, a fraud in which the settler only pretends to register an item and does not bag item is also possible. In this case, a fraud recognition image and a warning message are displayed on the touch panel 11 of the self-service POS terminal 10. The fraud recognition image identifies the item that the settler pretended to register. Therefore, as explained above, it is possible to achieve the effect of preventing a fraudulent act.

If the settler performs threshold N or more fraudulent acts, the fraud recognition image and the warning message are displayed on the display device of the attendant terminal 20. Therefore, since the attendant will likely notice the fraudulent act and arouses the settler's attention, the effect of preventing a fraudulent act is large.

If the customer is about to leave the checkout place without performing checkout, a fraud recognition image in which the face of the customer is imaged can be displayed on the display device of the attendant terminal 20. Therefore, even if the checkout place is crowded with many customers, the attendant can easily specify a customer who fraudulently leaves the checkout place.

[Modifications]

In an embodiment, the self-service POS terminals 10 each include a separate monitoring apparatus 50. However, in other examples, a monitoring apparatus 50 may be connected to two or more self-service POS terminals 10. The processor 51 of the monitoring apparatus 50 may provide the functions of the operation recognizing unit 511, the action recognizing unit 512, the fraud detecting unit 513, the image acquiring unit 514, and the output unit 515 for each of the two or more self-service POS terminals 10 to which it is attached.

The camera 60 need not be attached to the self-service POS terminal 10 in all examples. The camera 60 may be attached to, for example, the ceiling of the checkout place. In some examples, an action of the settler may be recognized from images captured by two or more cameras.

The actions recognized by the action recognizing unit 512 are not limited to the taking-out action, the registering action, the bagging action, and the exiting action. For example, actions for bagging an item taken out from a shopping bag without registering the item or passing the item to a companion may be recognized as a fraudulent action. In this case, an image capable of specifying the item can be segmented from an image in which the fraudulent action is recognized and output to the self-service POS terminal 10 or the attendant terminal 20. An output destination of the image may be another terminal type, for example, an information communication terminal carried by a store clerk. An action of a settler or a person other than the settler blocking the camera 60 with a hand, an arm, or the like may also be recognized.

In an embodiment, the fraud recognition image is output to be displayed together with the warning message as the function of the output unit 515. However, the function of the output unit 515 is not limited to this. For example, even if the output unit 515 outputs only the fraud recognition image to be displayed on the self-service POS terminal 10, the fraud preventing effect can be achieved in some examples.

In an embodiment, every time a fraud is detected, a fraud recognition image is output. However, the timing for outputting such an image is not limited to this. For example, the fraud recognition image may be output when the settler touches the checkout key Bx, that is, when the checkout start is requested. In such a case, upon determining YES in ACT 74 in FIG. 13, the processor 51 may omit the processing in ACT 76 to ACT 78 and proceed to the processing in ACT 45 in FIG. 10.

In an embodiment, the processor 51 recognizes pressing the start key as a request to begin use of the self-service POS terminal 10. In other examples, a human sensor capable of detecting a person standing in the front of the self-service POS terminal 10 may be provided. In such a case, the processor 51 may recognize the human sensor detecting a person as a request to begin use of the self-service POS terminal 10. In this case, when the human sensor stops detecting the presence of the person, the processor 51 may recognize that an exiting action is performed.

In an embodiment, the monitoring apparatus 50 may be present on the outside of the self-service POS terminal 10 or may be present on the inside of the self-service POS terminal 10. As another embodiment, the self-service POS terminal 10 is also capable of incorporating and realizing the functions of the monitoring apparatus 50. That is, the self-service POS terminal 10 may be a settlement apparatus (the self-service POS terminal 10) integrating action recognizing means (the action recognizing unit 512) that recognizes an action of a settler, operation recognizing means (the operation recognizing unit 511) that recognizes an operation input by the settler, fraud detecting means (the fraud detecting unit 513) that detects a fraudulent act of the settler based on recognition results of the action recognizing means and the operation recognizing means, image acquiring means (the image acquiring unit 514) that acquires, from a captured image of a camera that images the settler who operates the settlement apparatus, an image for specifying the fraudulent act detected by the fraud detecting means, and output means (the output unit 515) that outputs the image for specifying the fraudulent act.

While certain embodiments have been described, these embodiments are presented by way of example only, and are not intended to limit the scope of the present disclosure. The novel embodiments can be implemented in various other forms and various omissions, substitutions and modifications can be made without departing from the spirit of the present disclosure. Such embodiments and modifications thereof are included in the scope and spirit of the disclosure, and are included in the claims and equivalents of thereof.

What is claimed is:

1. A monitoring apparatus, comprising:
   a camera interface for connecting to a camera;
   a terminal interface for connecting to a point-of-sale terminal;
   a communication interface for connecting to an attendant terminal; and
   a processor configured to:
      recognize actions of a settler at the point-of-sale terminal based on images from the camera;
      recognize input operations performed at the point-of-sale terminal by the settler based on information from the point-of-sale terminal;
      detect fraudulent acts of the settler based on a recognized action of the settler at the point-of-sale terminal and a recognized input operation of the settler at the point-of-sale terminal; and
      output a fraud detection image corresponding to a detected fraudulent act to the point-of-sale terminal, wherein
   the fraud detection image is output to a display device of the point-of-sale terminal.

2. The monitoring apparatus according to claim 1, wherein the fraud detection image is acquired from the camera.

3. The monitoring apparatus according to claim 1, wherein the fraud detection image is acquired from a commodity scanner of the point-of-sale terminal.

4. The monitoring apparatus according to claim 1, wherein the actions of the settler recognized by the processor include a taking-out action by which the settler picks up an item from a shopping basket placed on a first table of the point-of-sale terminal and a bagging action by which the settler places an item into a shopping bag placed on a second table of the point-of-sale terminal.

5. The monitoring apparatus according to claim 4, wherein the processor recognizes a registration input operation in which an item is registered at the point-of-sale terminal by a scanning of a barcode on the item at the point-of-sale terminal.

6. The monitoring apparatus according to claim 5, wherein the processor detects a fraudulent act if the taking-out action and the bagging action are recognized without the registration input operation being recognized between the time of the taking-out action and the bagging action.

7. The monitoring apparatus according to claim 6, wherein the fraud detection image depicts the item bagged in the bagging action.

8. The monitoring apparatus according to claim 1, wherein
   the actions of the settler recognized by the processor includes a registering action in which the settler holds an item in front of a scanner of the point-of-sale terminal,
   the processor recognizes a registration input operation in which an item is registered at the point-of-sale terminal by a scanning of a barcode at the point-of-sale terminal with the scanner,
   the processor detects a fraudulent act if the registering action is recognized but the scanning of the barcode fails, and
   the fraud detection image depicts the item held in front of the scanner during the recognized registering action.

9. The monitoring apparatus according to claim 1, wherein the processor is further configured to:
   output the fraud detection image corresponding to the detected fraudulent act to the attendant terminal.

10. A point-of-sale terminal, comprising:
    a first table on which a settler can place items to be registered in a sales transaction;
    a second table on which the settler can place items registered in the sales transaction;
    a display screen for displaying information to the settler;
    a scanner for reading a barcode on an item to be purchased in the sales transaction;
    a camera interface for connecting to a camera;
    a communication interface for connecting to an attendant terminal; and
    a processor configured to:
       recognize actions of a settler at the point-of-sale terminal based on images from the camera;
       recognize input operations performed at the point-of-sale terminal by the settler;
       detect fraudulent acts of the settler based on a recognized action of the settler at the point-of-sale terminal and a recognized input operation of the settler at the point-of-sale terminal;
       output a fraud detection image corresponding to a detected fraudulent act to at least one of the display screen and the attendant terminal.

11. The point-of-sale terminal according to claim 10, wherein the fraud detection image is acquired from the camera.

12. The point-of-sale terminal according to claim 10, wherein the fraud detection image is acquired from a commodity scanner of the point-of-sale terminal.

13. The point-of-sale terminal according to claim 10, wherein
    the actions of the settler recognized by the processor include a taking-out action by which the settler picks up an item from a shopping basket placed on the first table of and a bagging action by which the settler places an item into a shopping bag placed on the second table,
    the processor recognizes a registration input operation in which an item is registered by a scanning of a barcode on the item with the scanner,
    the processor detects a fraudulent act if the taking-out action and the bagging action are recognized without the registration input operation being recognized between the time of the taking-out action and the bagging action, and the fraud detection image depicts the item bagged in the bagging action.

14. The point-of-sale terminal according to claim 10, wherein
the actions of the settler recognized by the processor includes a registering action in which the settler holds an item in front of the scanner,
the processor recognizes a registration input operation in which an item is registered at the point-of-sale terminal by a scanning of a barcode with the scanner,
the processor detects a fraudulent act if the registering action is recognized but the scanning of the barcode fails, and
the fraud detection image depicts the item held in front of the scanner during the recognized registering action.

15. The point-of-sale terminal according to claim 10, wherein the processor is further configured to:
register the item to be purchased in the sales transaction based on a reading of the barcode by the scanner.

16. The point-of-sale terminal according to claim 10, wherein the fraud detection image is output to the display screen.

17. A non-transitory, computer-readable medium storing program instructions which when executed by a processor of a monitoring apparatus causes the monitoring apparatus to perform a method comprising:
recognize an action of a settler at a point-of-sale terminal based on images from a camera;
recognize an input operation performed at the point-of-sale terminal by the settler based on information from the point-of-sale terminal;
detect a fraudulent act of the settler based on a recognized action of the settler at the point-of-sale terminal and a recognized input operation of the settler at the point-of-sale terminal; and
output a fraud detection image corresponding to a detected fraudulent act to a display device of the point-of-sale terminal.

18. The non-transitory, computer-readable medium according to claim 17, wherein the fraud detection image is acquired from the camera.

19. The non-transitory, computer-readable medium according to claim 17, wherein the fraud detection image is acquired from a commodity scanner of the point-of-sale terminal.

20. The non-transitory, computer-readable medium according to claim 17, wherein the fraud detection image is also output to the attendant terminal.

* * * * *